(12) United States Patent
Blalock et al.

(10) Patent No.: US 9,695,977 B2
(45) Date of Patent: Jul. 4, 2017

(54) ELECTRONIC DEVICE HOLDER WITH TRIPOD MOUNT AND HAND GRIP

(71) Applicant: Gript Inc., Portland, OR (US)

(72) Inventors: John Blalock, Seattle, WA (US); Martin Phipps, Portland, OR (US)

(73) Assignee: Gript Inc., Portland, OR (US)

( * ) Notice: Subject to any disclaimer, the term of this patent is extended or adjusted under 35 U.S.C. 154(b) by 0 days.

(21) Appl. No.: 15/161,332

(22) Filed: May 23, 2016

(65) Prior Publication Data

US 2016/0348835 A1 Dec. 1, 2016

Related U.S. Application Data

(60) Provisional application No. 62/168,737, filed on May 30, 2015.

(51) Int. Cl.
| | |
|---|---|
| *F16M 13/02* | (2006.01) |
| *F16B 2/06* | (2006.01) |
| *F16B 2/12* | (2006.01) |
| *A45F 5/00* | (2006.01) |

(52) U.S. Cl.
CPC ............ *F16M 13/022* (2013.01); *A45F 5/00* (2013.01); *F16B 2/065* (2013.01); *F16B 2/12* (2013.01); *A45F 2005/006* (2013.01); *A45F 2005/008* (2013.01); *A45F 2200/0508* (2013.01); *A45F 2200/0516* (2013.01); *A45F 2200/0525* (2013.01); *A45F 2200/0533* (2013.01)

(58) Field of Classification Search
CPC ......... F16M 13/022; F16B 2/065; F16B 2/12; A45F 5/00; A45F 2005/006; A45F 2005/008; A45F 2200/0508; A45F 2200/0516; A45F 2200/0525; A45F 2200/0533
USPC ....... 248/309.1, 316.1, 316.4, 316.6, 229.12, 248/229.22; 24/193, 455, 68 R; 348/376; 396/419, 423, 428
See application file for complete search history.

(56) References Cited

U.S. PATENT DOCUMENTS

| | | | | |
|---|---|---|---|---|
| 5,769,292 | A * | 6/1998 | Cucheran | B60R 9/045 224/319 |
| 6,370,741 | B1 * | 4/2002 | Lu | A47B 21/045 24/523 |
| 6,536,911 | B1 * | 3/2003 | DiAngelo | F21V 21/0885 33/772 |

(Continued)

*Primary Examiner* — Tan Le
(74) *Attorney, Agent, or Firm* — Hancock Hughey LLP (57) ABSTRACT

A multi-function clamp with integrated universal mount for an electronic device, such as a camera phone or tablet computer is described. The clamp may be adapted to support the electronic device in a variety of configurations, such as placed upon a desktop, strapped to a user's hand or fastened to a multiple of photography stability devices, such as a tripod or shoulder rig. The clamp may also allow secure mounting of electronic device to a number of objects, such as a tree, handlebar, auto interior, etc. when used with elastomer, adhesive or hook and loop straps. The clamp may be used with an electronic control module that mounts to a shoe on the clamp and electronically connects with the electronic device. The clamp may be used in combination with a hot shoe for attachment to a conventional SLR camera, wherein a camera phone is either wirelessly or with a wire interfaced to the SLR so that activation of the camera phone simultaneously activates the SLR.

13 Claims, 13 Drawing Sheets

(56) References Cited

U.S. PATENT DOCUMENTS

| | | | |
|---|---|---|---|
| 9,108,096 B2* | 8/2015 | Solheim | A63B 69/3632 |
| 2012/0257346 A1* | 10/2012 | Hulet | H04M 1/04 |
| | | | 361/679.32 |
| 2014/0103181 A1* | 4/2014 | Duerigen | F16M 11/041 |
| | | | 248/289.11 |
| 2016/0348835 A1* | 12/2016 | Blalock | F16M 13/022 |

* cited by examiner

ELECTRONIC DEVICE HOLDER WITH TRIPOD MOUNT AND HAND GRIP

TECHNICAL FIELD

The present invention relates to a support apparatus adapted to support an item mounted in the device in a variety of configurations, and more specifically, an adjustable mount for an electronic device such as a smart phone, and which includes hand gripping elements.

BACKGROUND AND DESCRIPTION OF RELATED ART

Modern portable electronic devices, such as camera phones or tablet computing devices, are not well adapted to be positioned other than gripped vertically as a phone or placed on a flat surface. These items are typically flat, rectangular objects which may be difficult to place in an appropriate position for photography or videography. And while most smart phones and tablet computers include very high quality lenses and cameras, use of these devices as a camera requires two-handed operation and even then is unstable and insecure.

Such devices may be enhanced with the use of clamps that allow mounting to a handle or a single type of tripod. The use of a camera phone or tablet device may be enhanced with the use of a support structure with a secure hand grip and a universal mounting base. There are many mounts on the market today that are configured for attachment to smart phones and other electronic devices. However, none of the available products addresses all of the needs of users who desire to use the device to produce high quality videography and photography.

What is called for is a secure clamp to hold the device coupled to a secure and adjustable hand strap. What is also called for is a clamp which allows the mounting of the camera phone or tablet device in multiple configurations to a variety of different tripod types.

SUMMARY OF THE INVENTION

A multi-function clamp with integrated universal mount and hand strap for an electronic device, such as a camera phone or tablet computer. The clamp may be adapted to support the electronic device in a variety of configurations, such as placed upon a desktop, strapped to a user's hand or fastened to a variety of photography stability devices, such as a tripod or shoulder rig. The clamp may also allow secure mounting of an electronic device to a number of objects, such as a tree, handlebar, auto interior, etc. when used with elastomer, adhesive or hook and loop straps. The clamp may be used with an electronic control module that mounts to the shoe and electronically connects with the electronic device.

BRIEF DESCRIPTION OF THE DRAWINGS

The invention will be better understood and its numerous objects and advantages will be apparent by reference to the following detailed description of the invention when taken in conjunction with the following drawings.

In FIG. 6A the clamp is extended to its fully open position; in FIG. 6B the clamp has been moved to an intermediate position; and in FIG. 6C the clamp is adjusted to its most compact or retracted position. It will be appreciated by reference to FIGS. 6A through 6C that as screw assembly 8 is axially rotated the second jaw 3 is translated relative to first jaw 2. More specifically, the position of threaded rod 20 relative to first jaw 2 remains constant as rod 20 is rotated because the bores 104 and 106 in first jaw 2 through which the rod extends are not threaded. On the other hand, the bore 26 in second jaw 3 through which rod 20 extends is threaded. As such, as the rod is rotated, second jaw 3 is moved either upwardly or downwardly (depending on the direction of rotation of the rod) as the threads of the rod turn in the threads of the bore 26. This translation of the second jaw relative to the first jaw allows for an electronic device 10 to be located in seat 101 and to be clamped in the seat by the user rotating rod 20.

FIGS. 18 through 21 are a series of views illustrating the clamp according to the present invention with a wireless hot shoe device that provides an interface between a conventional camera such as an SLR camera and the inventive clamp and a smart phone; specifically

FIGS. 22 through 25 are a series of views illustrating the clamp according to the present invention with a wired hot shoe device that provides an interface between a conventional camera such as an SLR camera and the inventive clamp and a smart phone; specifically

DETAILED DESCRIPTION OF PREFERRED EMBODIMENTS OF THE INVENTION

The invention will now be described in detail with reference to the drawings. It will be understood that relative directional terms are used at times to describe components of the invention and relative positions of the parts. As a naming convention, a horizontal ground plane is to be considered to be a generally horizontal reference surface. Other relative directional terms correspond to this convention: "upper" refers to the direction above and away from the ground plane; "lower" is generally in the opposite direction, "inward" is the direction from the exterior toward the interior of the invention, "vertical" is the direction normal to the horizontal ground plane, and so on. It will be understood that like structures in the various drawing figures are assigned like reference numbers, regardless of whether a structure in a particular drawing is labelled with a reference number.

Figure 1:
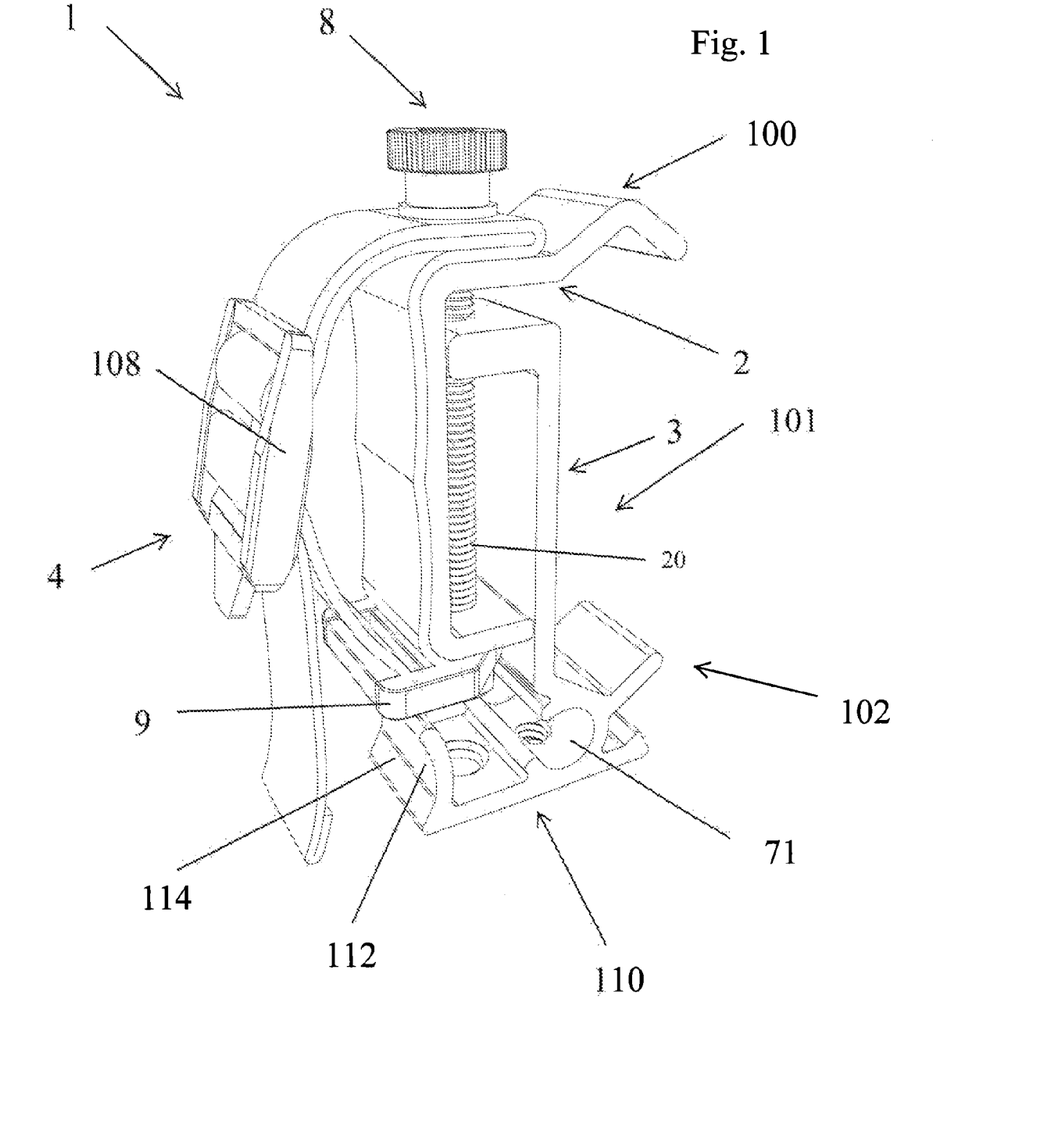
FIG. 1 is a perspective view of a first preferred embodiment of an electronic device clamp according to the present invention, showing the clamp from the hand-strap side of the clamp.
Figure 2:
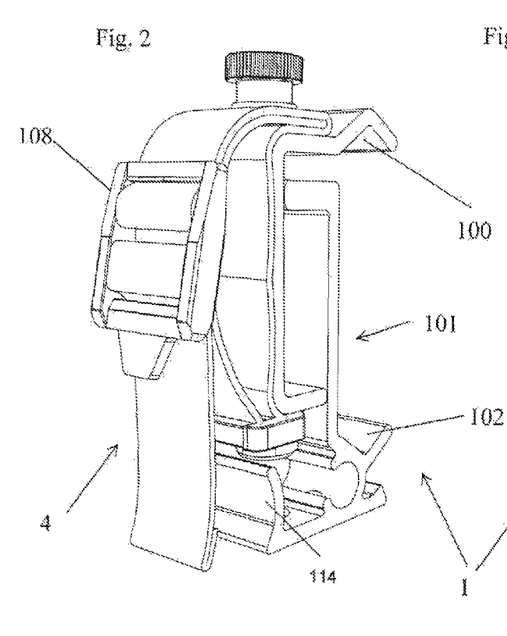
FIG. 2 is a perspective view of the clamp shown in FIG. 1, showing the clamp from the hand strap side.
Figure 3:
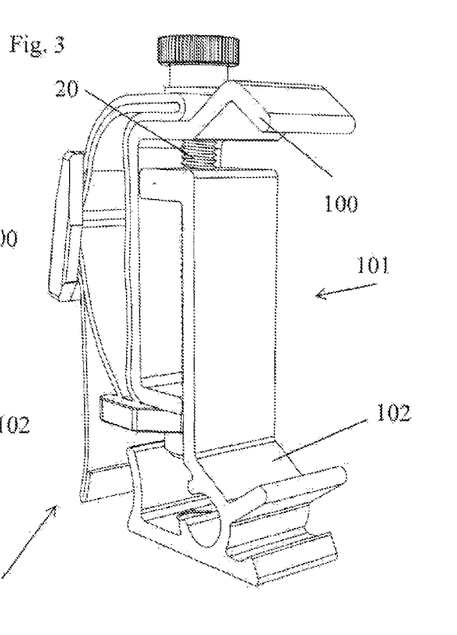
FIG. 3 is a perspective view similar to the view of FIG. 1 except illustrating the clamp from the electronic device mounting side.

Turning to FIG. 1, electronic device clamp 1 comprises an upper jaw 2 movably coupled to a lower jaw 3 with a screw assembly 8 that interconnects the upper and lower jaws together and allows for the two jaws to be translated relative to one another to allow adjustment between extended and retracted positions. Upper jaw 2 includes a generally V-shaped extension 100 and lower jaw 3 includes an oppositely oriented and generally V-shaped extension 102 and the extensions define clamping surfaces between which an electronic device is retained—the relatively oppositely oriented apex of each V of the V-shaped extensions together define opposite cupping elements for holding the electronic device. The combination of the facing extensions 100 and 102 thus define a seat shown generally at 101 for receiving and clamping therebetween an electronic device 10, such as a smart phone. In the assembled clamp 1, screw assembly 8 is operable to adjust the distance between extensions 100 and 102 and the pressure exerted between both jaws 2 and 3 to securely retain the device 10 in the seat 101.

Figure 4:
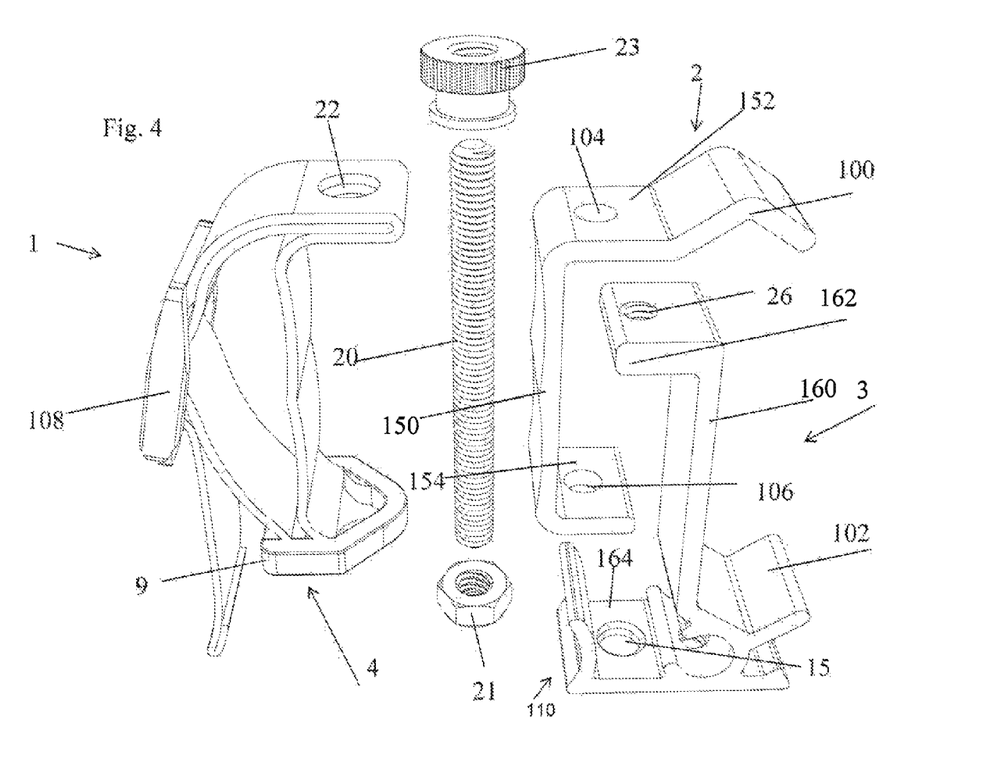
FIG. 4 is an exploded perspective view of the electronic device clamp according to the present invention.

Screw assembly 8 is defined by a threaded rod 20 that extends, serially from top to bottom in the view of FIG. 1 and as labelled in FIG. 4, through aligned unthreaded bore 104 in upper jaw 2, threaded bore 26 in lower jaw 3, and unthreaded bore 106 in upper jaw 2. A nut 21 (or other rod-position fixing device such as a swaged distal end to prevent longitudinal movement of rod 20 once it is extended through the bores 104, 26, and 106, respectively) is threaded onto the lower end of the threaded rod 20 immediately below the bore 106 so that the nut abuts the lower surface of the D-ring 9 that rests below the portion of upper jaw 3 through which bore 106 extends. A thumb nut 23 is affixed to the upper end of the rod. It will be appreciated that by axially rotating the threaded rod 20 by turning thumb nut 23 the lower jaw 3 is moved relative to the upper jaw 2 so that the distance between the extensions 100 and 102 may be varied. As detailed below, this allows for insertion of electronic device 10 into seat 101 and for securing the device in the seat.

With continuing reference to FIG. 1, an adjustable hand strap assembly 4 is attached at the rear of the electronic device holder 1, and more specifically, strap assembly 4 is attached with the screw assembly 8 to the upper jaw 2 and a D-ring 9 at the lower end of the assembly 4. The strap assembly is adjustable with a conventional slip buckle 108 to create a secure insertion loop for one or more fingers to grasp the electronic device clamp 1 from behind and to thereby allow user to hold and operate an electronic device 10 securely with only one hand. Strap assembly 4 is adjustable to fit a plurality of fingers, a glove or mitten. Strap assembly 4 can also be quickly unbuckled and re-buckled with slip buckle 108 to allow securing of electronic device holder to a pole, tree or similar object. It will be appreciated that the buckle 108 may be replaced with overlapping straps fitted with hook and loop fasteners.

With reference to FIG. 4, which illustrates clamp 1 in an exploded view, strap assembly 4 can be a molded polymer grip or polymer webbing, hook and loop material, leather, cord or similar. If strap assembly 4 is constructed with polymer webbing or fabric, the material can be a continuous length that wraps through top of buckle 108 and doubles back at the bore 22, then alongside the rear exterior surface of the upper jaw 2 until it loops through D-Ring 9 before it can finally loop through lower insertion point of slip buckle 108. A hole can be melted or drilled into strap or cord at top of strap folds to secure top of hand strap assembly 4 to the upper jaw 2. Such a fabric end strap could be sewn over on itself at its termination to inhibit strap from slipping back through the buckle 108 after construction.

Figure 6A:
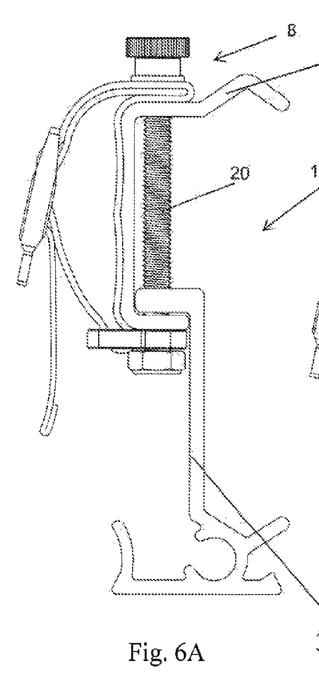
FIGS. 6A through 6C are a series of illustrations showing the vertical adjustability of the present invention to allow the clamp to accept electronic devices of different sizes.
Figures 6B, 6C:
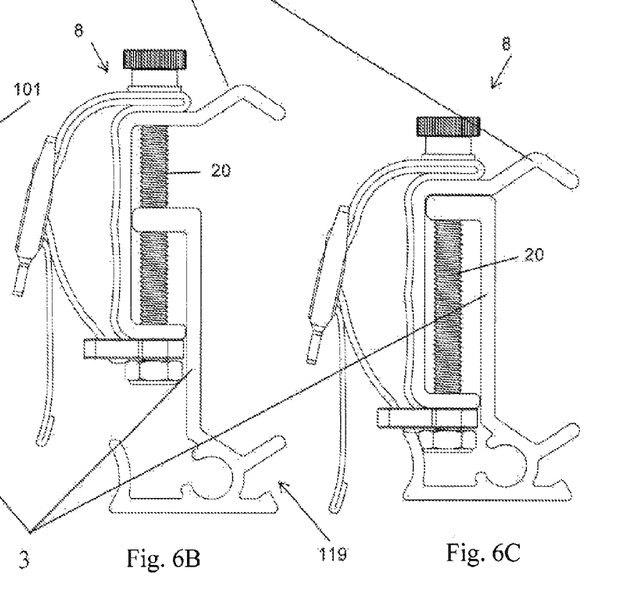

Described in general terms and with referenced to the view of FIG. 4, upper jaw 2 is a generally C-shaped member that has a vertically extending portion 150 and opposed upper and lower arms, 152 and 154, respectively, that extend from the vertically extending portion at roughly 90 degrees thereto. The V-shaped extension 100 forms a part of the upper arm 152 and bore 104 is formed through the upper arm 152 and bore 106 is formed through the lower arm 154. Lower jaw 3 also has a generally C-shaped overall but is oriented oppositely relative to upper jaw 2. More specifically, lower jaw 3 is defined by a vertically extending portion 160, and an upper arm 162 through which threaded bore 26 is formed. The lower arm 164 of lower jaw 3 is defined by the foot portion 110 and bore 15 extends through the lower arm 164. The lower arm 164 has at its distal end a transversely oriented and curved surface extension 112 that defines a finger rest 114. The V-shaped extension 102 extends generally in the opposite direction of the lower arm 164. When the clamp is assembled, as best shown in the series of FIGS. 6A, 6B and 6C, the upper and lower arms of the upper and lower jaws are overlapped with the C-shapes of the jaws oriented in opposite directions so that the bores 104, 26 and 106 align so that threaded rod 20 may be extended through the aligned bores, as described.

It will be understood that the lower arm 164 and the finger rest 114 that it defines may be omitted, in which case the lower jaw 3 takes on a rough S-shape when taking into account the V-shaped extension 102.

With returning reference to FIG. 1, the lower or foot portion 110 of lower jaw 3 defines a flattened lower surface to provide a stable base for the clamp 1. The clamp is balanced so that the center of gravity of the clamp, whether with or without an electronic device attached thereto, is roughly centered over the geometric middle of the foot portion 110 so that the device with an electronic device 10 mounted to it may be placed vertically upon a table top or other flat surface without tipping over.

Figure 5:
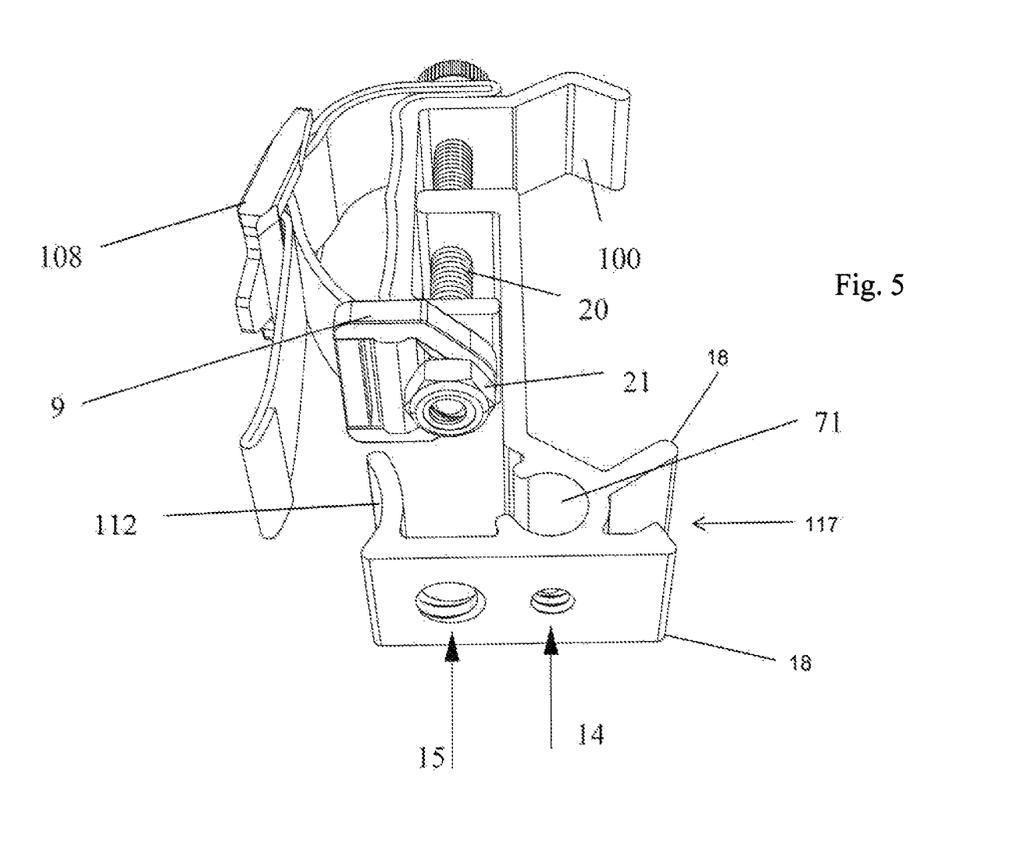
FIG. 5 a bottom perspective view of the clamp shown in FIG. 1.

In continuing reference to FIG. 1, the foot portion 110 of the lower jaw 3 allows mounting of the clamp 1 on multiple different platforms. As best shown in FIG. 5, a threaded borehole 14 allows mounting the clamp to a standard ¼" tripod, light stand, steady rig, shoulder rig or similar threaded mount. Threaded borehole 15 allows mounting to standard ⅜" tripod, video rig or light stand threaded mount. In reference to FIG. 1, the foot portion 110 is rectangular and includes a beveled chamfered edge on its opposite distal ends to allow mounting on an Arca-Swiss type quick release tripod mount. Adjacent foot portion 110, the lower jaw 3 translates upwardly at a curved section 112 that, as detailed below, defines a finger rest 114.

Figure 9:
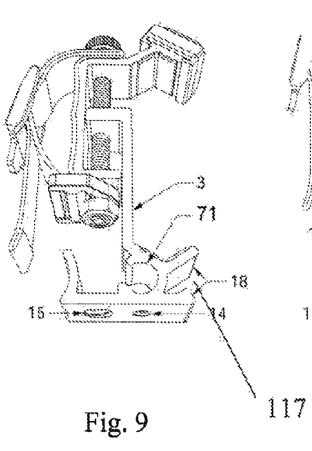
FIG. 9 is a lower perspective view of the clamp shown in FIG. 8.

In reference to FIG. 9, as shown in, for example, the gap at 117 between beveled edges 18 functions as a bottle top remover 119 for removal of crown seals from beverage containers.

The lower jaw 3 includes a cylindrical tunnel 71 that extends transverse to the axis of threaded rod 20 and which functions as a rod or threaded rod holder for mounting of accessory rods or an alternative mounting surface or object. Accessory rods are used in photography to support lights, microphones and to support other cameras and electronic devices. Rods can be secured in tunnel 71 by insertion of a thumb screw, set screw, tripod mounting screw or similar into threaded borehole 14 which is positioned directly beneath tunnel 71 and which extends into the tunnel for this purpose.

Figures 10, 11:
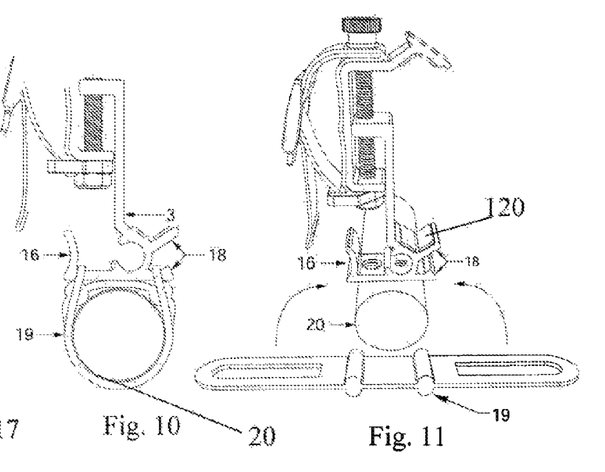
FIG. 10 is a side elevation view of the clamp according to the invention, illustrating the clamp attached to a cylindrical rod.
FIG. 11 is a perspective view of the clamp shown in FIG. 10 with the structures that attach the clamp to the cylindrical rod shown in exploded view.
Figure 12:
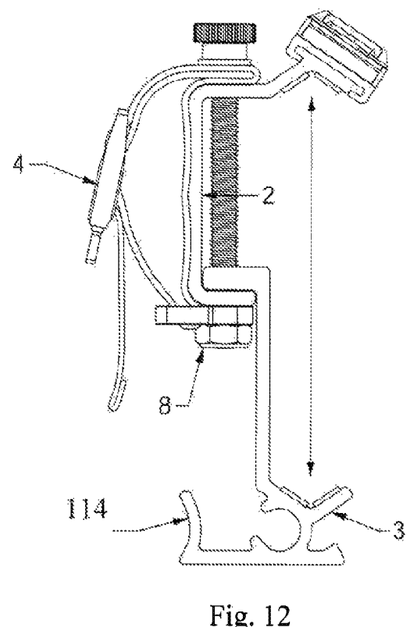
FIG. 12 is a side elevation view showing the clamp according to the invention in its extended position.

In FIG. 10 it may be seen that the upper end 16 of finger rest tab 114 and edge 18 act as anchor points for securing a strap of elastomeric material 19, fabric, cord or similar, to secure clamp 1 to a pole, tree, tube, bicycle, gear shifter, or similar object.

As shown in FIGS. 10 and 11, band 19 may be used to secure clamp 1 to an external object such as rod 20 by either single or double wrapping object prior to hooking the anchor points defined by edges 16 and 18.

Turning to the series of images of FIGS. 6A, 6B and 6C, electronic device clamp 1 is operable by axial rotation of screw assembly 8 to move or translate the upper and lower jaws 2 and 3 relative to one another, between the full extension position of FIG. 6A (i.e., the fully open position) and the fully retracted position of FIG. 6C (i.e., the fully closed or clamped position), and of course any intermediate position as shown in FIG. 6B. In reference again to FIG. 1, upper jaw 2 and lower jaw 3 remain in parallel alignment at all positions with rotation of screw assembly 8 so that the V-shaped extensions 100 and 102 of the respective jaws are squared and positioned accept an electronic device 10 in the seat 101. This creates secure and simple operation with no additional weight, bulk or parts needed to align the upper jaw 2 and lower jaw 3.

Figure 13:
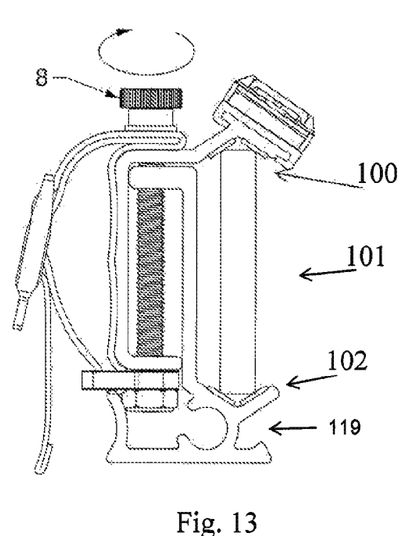
FIG. 13 is a side elevation view of the clamp shown in FIG. 12 in the retracted position with an electronics device retained in the clamp.

FIG. 13 and various other figures show an electronic device 10 secured in the seat 101 defined between extensions 100 and 102 of electronic device clamp 1, with the clamp in the fully closed position. Interlocking placement of upper jaw 2 and lower jaw 3 allows for greater size variations to accommodate the broadest range of electronic device sizes while remaining compact and light weight as compared to other similar electronic device holders. For example, the clamp 1 may be used to secure smart phones such as those shown, or tablet computers and the like.

Figure 7:
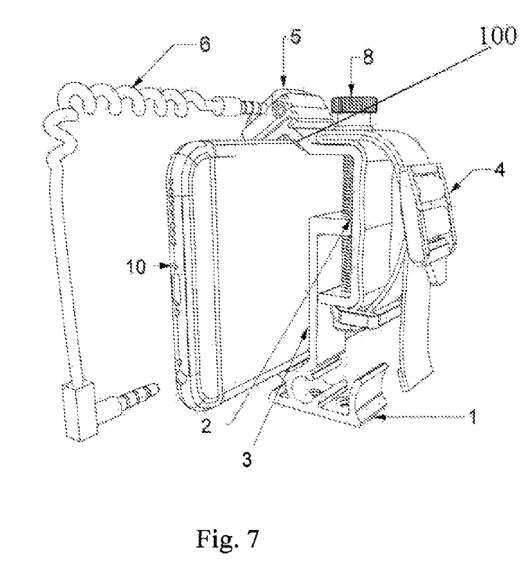
FIG. 7 is a front perspective view of the electronics device clamp according to the invention, including an optional control module, and in which an electronics device, namely, a smart phone, is shown clamped in the clamp.
Figure 8:
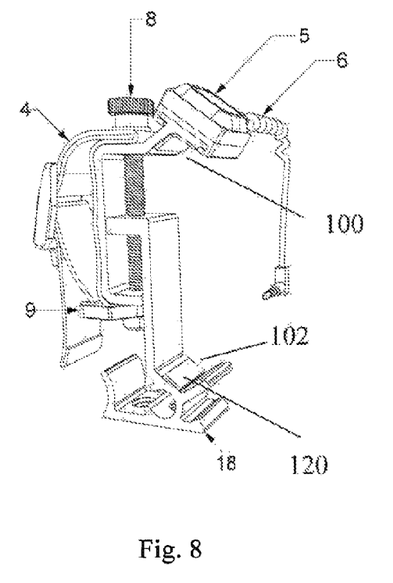
FIG. 8 is a rear perspective view of the clamp shown in FIG. 7, and in which the smart phone, is removed from the clamp.

Both the upper and lower jaws 2 and 3 may be fabricated from machined or extruded aluminum, or any other suitable material including, for example, molded plastics. As best shown in FIG. 8, elastomeric or similar pads 120 with pressure sensitive backing may be applied to the inner surfaces of V-shaped extensions 100 and 102 to provide a firm and non-damaging receptacle for the electronic devices as referenced in FIG. 7 that are secured by the clamp 1.

Figure 14:
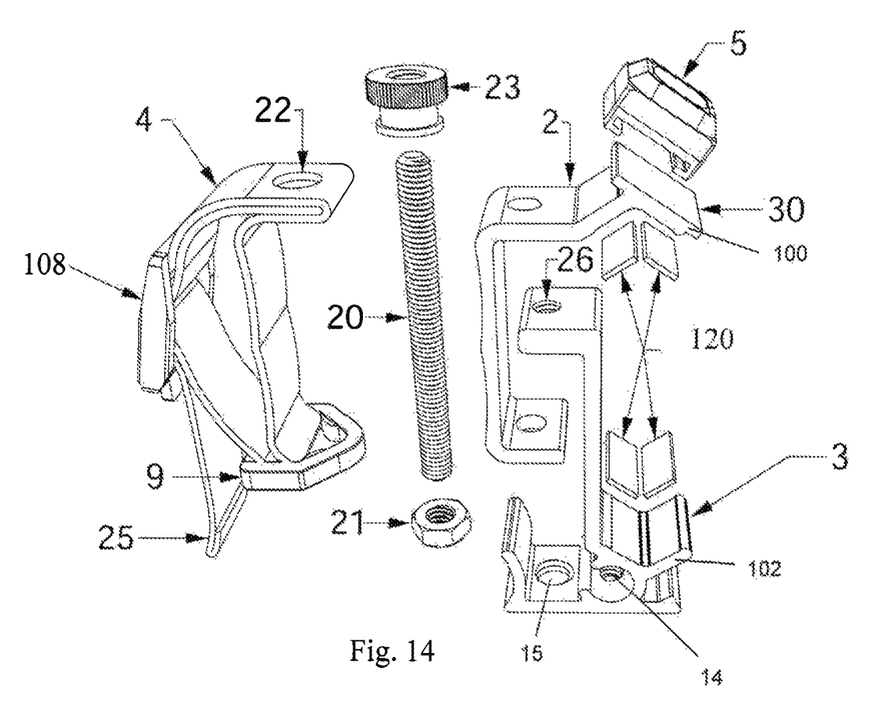
FIG. 14 is an exploded perspective view of the electronic device clamp according to the present invention similar to FIG. 4, but including an optional control module.

In reference to FIG. 14, in general terms, electronic device clamp 1 may be assembled according to the following steps:

A. Elastomeric or similar pads 120 with pressure sensitive backing are firmly pressed onto the inner-facing surfaces of the V-shaped extensions of upper jaw 2 and lower jaw 3;

B. Hand strap assembly 4, which can be constructed as above, is held over the backside of upper jaw 2 and the holes in the strap assembly are aligned at the upper bore 22 and lower D-ring 9;

C. Lower jaw's threaded borehole 26 is placed in alignment with upper jaw 2 and hand strap 4 and the threaded stud 20 or similar is inserted and screwed through all aligned holes from step 2;

D. Thumb nut 23 or similar is threaded only halfway to the top of its internal threads onto top of stud 20 and bound in place with adhesive, polymer insert, mechanical deformation or similar;

E. Nut 21 is turned onto the stud 20 until fit is snug but not tight. Nut 21 is bound to stud 20 using adhesive, polymer insert, mechanical deformation or similar;

F. Electronic control module 5, whether wired or wireless, can be press fit onto cold shoe mount on top surface of upper jaw 2.

Figure 15:
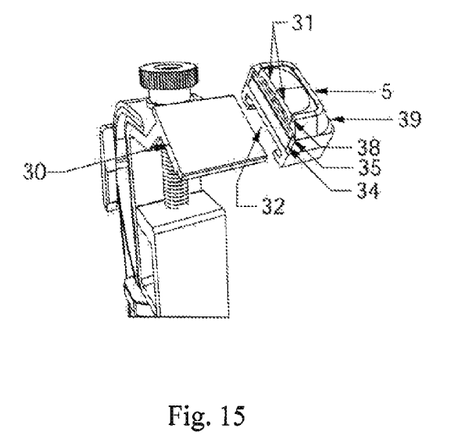
FIG. 15 is a fragmentary and partially cross sectional view of the upper portion of the clamp according to the present invention, illustrating the mount for the control module.
Figure 16:
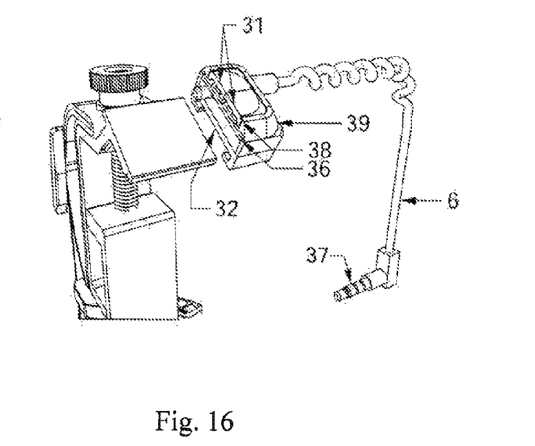
FIG. 16 is a fragmentary and partially cross sectional view of the upper portion of the clamp according to the present invention similar to FIG. 15 and including a cord.

With reference now to FIGS. 15 and 16, the shoe mount 30 for the wireless electronic control module 5 is shown in detail. Control module 5 can be constructed using a plastic or metal flash shoe mount 30 that holds the module to any shoe mount and also functions as the bottom portion of the controller's case. Mounted on top of the flash shoe mount 30 could be a wireless circuit board 35 with a bottom mounted wafer battery 34. The wireless circuit board can be insulated from moisture and other environmental contaminants with an elastomeric membrane 38. The controller board 35 can have pressure sensitive micro switches actuated through the membrane by placement of a possibly illuminated switches module 31 on top which can be secured by a bezel cover 39. The bezel cover 39 is ultimately bonded to the shoe mount 30 with mechanical screws or a mechanical or press fit latch. The bezel can be constructed using plastic or metal and can be weather resistant from the application of the bezel. The wired electronic control module 5 (e.g., FIG. 10) connects to an electronic device's (i.e., smart phone 10) audio port using a three or more conductor cable 6 and can have connectors on both ends allowing different cable lengths and configurations to be deployed. The end connector 37 attaches to an electronic device 10, usually a smart phone, and can typically trigger the shutter or start and stop recording audio or video depending upon the electronic devices software and configuration.

Electronic control module 5 with removable cable 6 that plugs into the audio port of electronic device 10 and can control various operations, such as shutter release, flash, flashlight, and other camera controls depending upon electronic device's software application. Electronic module 5 may also or alternatively have wireless control capability utilizing a short-distance communication module for technologies such as Bluetooth, infrared light communication, XBee, ultra-wideband (UWB), and near field communication (NFC).

Figure 17:
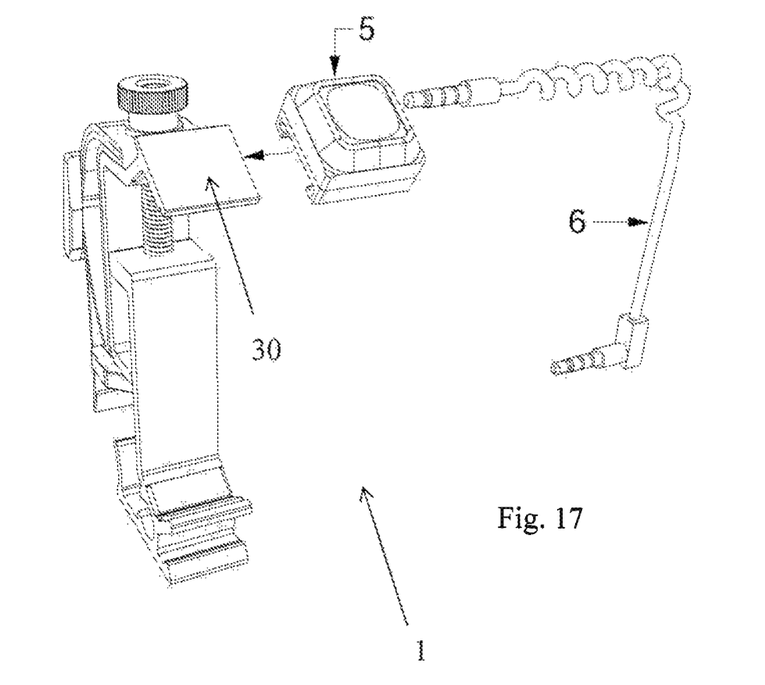
FIG. 17 is a perspective view of the clamp according to the present invention, including the control module and connecting cord.

Referring now to FIG. 17, the positioning of the wired electronic control module 5 and connection cable 6, prior to insertion and mounting of electronic device 10 is illustrated.

The construction details of the invention as shown in FIG. 17 shows mounting position of the electronic device control module 5 onto cold shoe mount 30 by a press-fit slide action and held in place by a spring clip which could be made of stamped sheet metal.

It will be appreciated that clamp 1 may be used in a variety of different ways, both hand-held and mounted to other objects. For instance, during hand-held use of claim 1 according to the present invention, the user's hand is inserted strap assembly 4 with the user's little finger resting on the finger rest 114. The clamp 1 may be attached with an elastic band to a control lever of an automobile such that the electronic device 10, a smart phone, faces the vehicle interior. And the device 10 may be mounted in clamp 1 in an offset fashion so that the user may grasp both the clamp 1 and the device 10 to provide excellent control during use.

The clamp 1 according to the invention may further be combined with a hot shoe module as described below and which further forms a part of the invention. The hot shoe module is shown in FIGS. 18 through 25, and may be either wired or wireless.

Figures 20, 21:
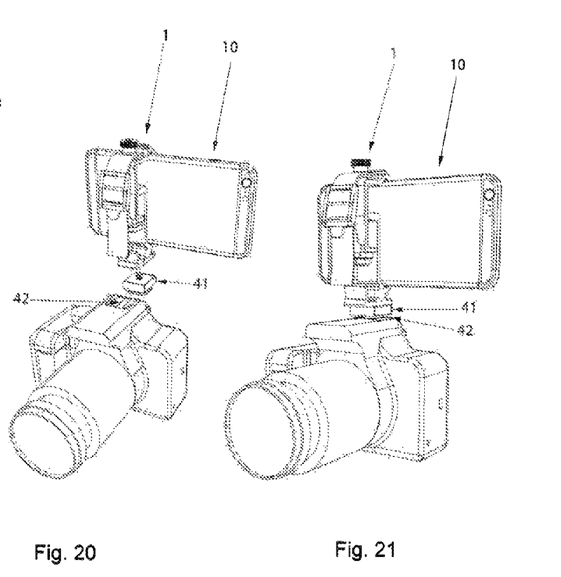
FIG. 20 is a perspective view of the wireless hot shoe shown in FIG. 18 in combination with the clamp according to the present invention, a smart phone in the clamp, and an SLR camera, wherein the components are shown in an exploded orientation.
FIG. 21 is a perspective view of the components shown in FIG. 20 in an assembled condition.

In reference to FIG. 21, wireless hot shoe module 41 allows a camera hot shoe mount 42 as an attachment base for an electronic device 10 using an electronic device clamp 1 as described above.

In reference to FIG. 20, wireless hot shoe module 41 can trigger operations of electronic device 10 such as shutter, flash, or other based upon software in electronic device 10. The module 41 is controlled by the camera's hot shoe mount 42. The wireless hot shoe module 41 need not be attached to the electronic device holder to control an electronic device, but within range of the wireless hot shoe module's signal In further reference to FIG. 20, the hot shoe module 41's control of the electronic device 10 is triggered by signal from camera's hot shoe mount 42 when the module 14 is mounted into the camera's hot shoe 42 and module is communicating with electronic device 10. Mounting of electronic device holder 1 is not required for controlled operation between module 41 and electronic device 10.

Figure 18:
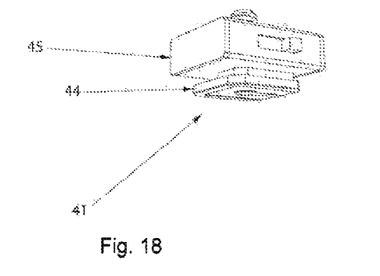
FIG. 18 is a perspective view of a wireless hot shoe module according to the invention.
Figure 19:
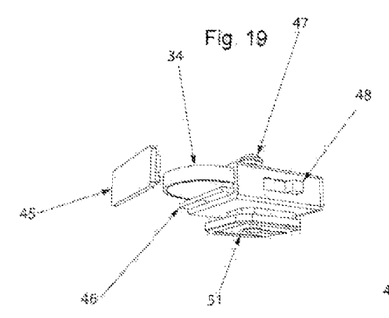
FIG. 19 is a perspective exploded view of the wireless hot shoe shown in FIG. 18.

With reference to FIGS. 18 and 19, the hot shoe module 41 is shown in detail. Hot shoe module 41 mounts to a camera's hot shoe using a standard hot shoe mount base 44 and contacts the hot shoe's electrical contacts on the bottom surface 51 of the base. The camera's hot shoe signal is translated by the integrated circuit board 46 and a wireless trigger signal is then transmitted by the module 41 according to selectable logic depending upon position of switch 48. Power needed to operate circuit and transmit signal is provided by battery 34. The battery is accessible through door 45.

Figure 25:
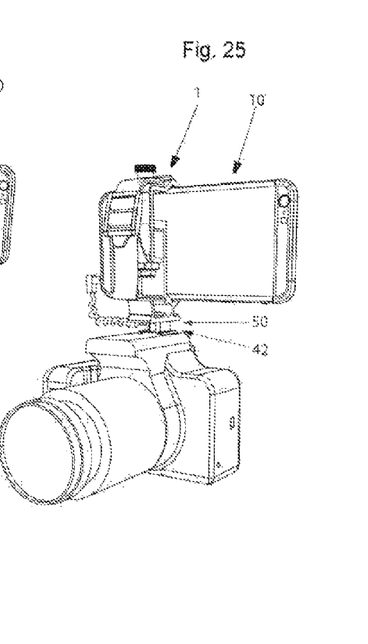
FIG. 25 is a perspective view of the components shown in FIG. 24 in an assembled condition.

In reference to FIG. 25, wired hot shoe module 50 allows a camera hot shoe mount 42 as an attachment base for an electronic device 10 using an electronic device clamp 1.

Figures 22, 23, 24:
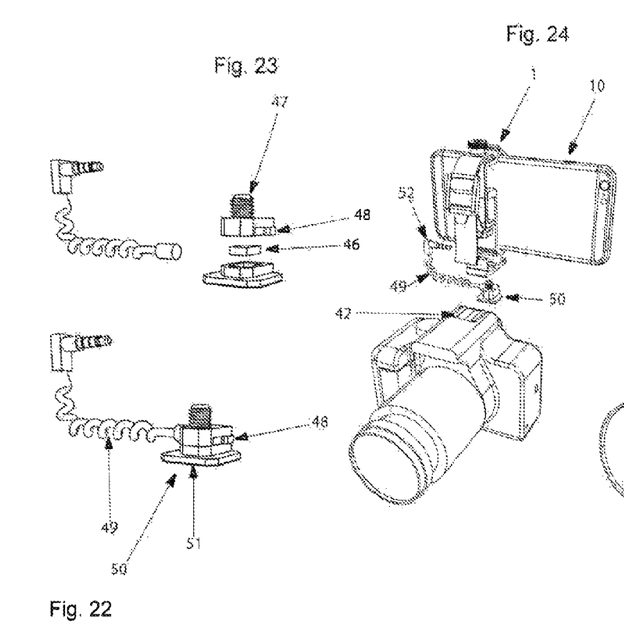
FIG. 22 is a perspective view of a wired hot shoe module according to the invention.
FIG. 23 is a perspective exploded view of the wired hot shoe module shown in FIG. 23.
FIG. 24 is a perspective view of the wired hot shoe shown in FIG. 22 in combination with the clamp according to the present invention, a smart phone in the clamp, and an SLR camera, wherein the components are shown in an exploded orientation.

In reference to FIG. 24, wired hot shoe module 50 can trigger operations of electronic device 10 such as shutter, flash, or other based upon software in electronic device 10. The wired module 50 is controlled by the camera's hot shoe mount 42. The wired hot shoe module 50 need not be attached to the electronic device holder to control an electronic device, but within range of the length of cable between the module 50 and the electronic device 10. The module cable 49 plugs into electronic device 10 audio port using audio connector 52.

In further reference to FIG. 24, the module's control of the electronic device 10 is triggered by signal from camera's hot shoe mount 50 when the module 50 is mounted into the camera's hot shoe 42 and module is communicating with electronic device 10. Mounting of electronic device holder 1 is not required for controlled operation between module 50 and electronic device 10.

With reference to FIGS. 22 and 23, the hot shoe module 50 is shown in detail. Hot shoe module 50 mounts to a camera's hot shoe using a standard hot shoe mount and contacts the hot shoe's electrical contacts on the bases bottom surface 51. The camera's hot shoe signal is translated by the integrated circuit board 46 and a wireless trigger signal is then transmitted by the module 50 according to selectable logic depending upon position of switch 48. A threaded rod extending upwardly from module 50 (and, with respect to wireless module 51 of FIGS. 18 through 21) and is positioned to thread into bore 15 in clamp 1 to thereby attach the clamp to the module 50.

While the present invention has been described in terms of a preferred embodiment, it will be appreciated by one of ordinary skill that the spirit and scope of the invention is not limited to those embodiments, but extend to the various modifications and equivalents as defined in the appended claims.

We claim:
1. An electronic device holder comprising:
a first jaw having a first clamping surface;
a second jaw having a second clamping surface facing said first clamping surface to define a seat therebetween for receiving an electronic device, said second jaw movable relative to said first jaw so that a distance between said first and second clamping surfaces may be varied;
a threaded rod extending through an unthreaded first bore in the first jaw, a threaded bore in the second jaw and a second unthreaded bore in the first jaw so that axial rotation of said threaded rod causes said second jaw to move relative to said first jaw;
a nut threaded onto a distal end of said threaded rod and abutting a lower surface of the first jaw to prevent longitudinal movement of said threaded rod so that said nut defines a threaded rod position fixing member;
wherein an electronic device may be clamped in the seat between the first and second clamping surfaces.

2. The electronic device holder according to claim 1 in which said first and second clamping surfaces are defined by oppositely oriented V-shaped members that define said seat for retaining said electronic device therebetween.

3. The electronic device holder according to claim 1 wherein the second jaw further defines a foot having a planar lower surface.

4. The electronic device holder according to claim 3 including an adjustable strap having a first end attached to the first jaw and a second end attached to the first jaw.

5. The electronic device holder according to claim 4 in which the threaded rod extends through a bore in the first end of said strap.

6. The electronic device holder according to claim 1 including a shoe on the first jaw for mounting an electronic control unit thereto.

7. An electronic device holder comprising:
a first jaw having a first clamping surface that is defined by a first V-shaped member;
a second jaw having a second clamping surface that is defined by a second V-shaped member and facing said first V-shaped member and spaced apart therefrom and said first and second V-shaped members are oppositely oriented;
first and second jaw position adjustment means for moving said second jaw relative to said first jaw so that a distance between said first and second clamping surfaces may be varied, wherein the first and second jaw position adjustment means is defined by an axially rotatable threaded rod that extends through an unthreaded first bore in the first jaw, through a threaded bore in the second jaw, and through an unthreaded second bore in the first jaw, and wherein an electronic device may be retained in the electronic device holder between the first and second V-shaped members.

8. The electronic device holder according to claim 7 including a mounting shoe on the first jaw.

9. The electronic device holder according to claim 8 including a flat base on the second jaw.

10. An electronic device holder comprising:
a first jaw, generally C-shaped and having a first clamping surface on an upper arm thereof, and an unthreaded bore through the upper arm and an unthreaded bore through a lower arm;
a second jaw, generally C-shaped and having a second clamping surface facing said first clamping surface, and a threaded bore through an upper arm, said second jaw oriented oppositely relative to said first jaw so that said unthreaded bores in said first jaw aligns with said threaded bore through said second jaw;
a threaded rod extending through the unthreaded bore in the upper arm of the first jaw, the threaded bore in the upper arm of the second jaw, and the unthreaded bore in the lower arm of the first jaw;
a threaded rod position fixing member on a distal end of said threaded rod to prevent longitudinal movement of said rod relative to said first and second jaws;
wherein, axial rotation of the threaded rod causes translation of said second jaw relative to said first jaw to vary a distance between said first and second clamping surfaces and to thereby retain an electronic device between the first and second clamping surfaces.

11. The electronic device holder according to claim 10 including a mounting shoe on the first jaw.

12. The electronic device holder according to claim 11 including a flat base on the second jaw.

13. The electronic device holder according to claim 12 in which the second jaw further defines a bottle opener.

\* \* \* \* \*